Sept. 22, 1959   T. McELRATH ET AL   2,905,805
GAS SHIELDED ARC WELDING
Filed Jan. 16, 1956

INVENTORS
THOMAS McELRATH
EUGENE F. GORMAN
BY Barnwell Q. King
ATTORNEY

2,905,805

GAS SHIELDED ARC WELDING

Thomas McElrath, Chatham, and Eugene F. Gorman, Rutherford, N.J., assignors to Union Carbide Corporation, a corporation of New York Application January 16, 1956, Serial No. 559,392

2 Claims. (Cl. 219—137)

This invention relates to the inert gas shielded arc welding of stainless steel and the like, and more particularly to such welding with a non-consumable electrode.

According to the invention there is provided a non-consumable electrode gas shielded arc process of welding metal such as stainless steel involving the use of an arc shielding gas containing hydrogen, in which porosity in the weld is avoided by the provision of suitable means for effectively preventing the entrapment in the weld of moisture that results from the burning of such hydrogen.

When inert gas shielded arc welding was first introduced, both argon and helium were used as shielding gases. Argon was valuable in a number of respects, but particularly because of its lower flow rate. Helium was valuable primarily because of its higher arc voltage which provided better welding conditions, particularly higher welding speed and increased weld penetration when welding stainless steel parts in thicknesses up to $3/16$ of an inch, for example.

Considerable effort was expended to improve argon so that it would provide higher welding speed and deeper penetration and still allow low flow rates. In many applications such as continuous tube and pipe welding, for example, high welding speeds are desirable. To obtain an increase in welding speed, it is necessary to use a shielding atmosphere which gives a relatively high arc voltage and, consequently, a relatively high heat input. Of all the various experiments, the most fruitful seemed to be the addition of hydrogen to argon. Since hydrogen gives the highest arc voltage of all known arc shielding gases, it is, therefore, desirable to use pure hydrogen or a mixture of hydrogen and an inert gas.

The additions of hydrogen to argon did provide higher arc voltages and, as was previously experienced with helium, improved welding conditions were achieved. For example, cross-sections of welds made with pure argon as the shielding gas, show severe undercutting, whereas cross-sections of welds made with an argon-hydrogen mixture as the shielding gas show no undercutting. An additional practical advantage was that unusually low flow rates of such gas could be employed and still provide satisfactory weld shielding.

The preliminary experimental work utilized bead-on-plate type of welds in arriving at the arc voltage measurements. In an effort to provide a shielding gas mixture which would surpass helium in arc welding performance, a mixture composed of 35% hydrogen and 65% argon was selected for extended trials. Practically all attempts to use such 35–65% mixture of hydrogen and argon on weld joints resulted in failure due to gross porosity formation in the resulting weld. It has been proposed (see Rothchild Patent No. 2,497,631), however, that by reducing the percentage of hydrogen to 10% or less in argon that porosity formation might possibly be eliminated as a serious factor. While the use of such low percentages of hydrogen in argon does not provide any very great improvement in performance, we have discovered that, contrary to the teaching of such patent, that it is useful in helium.

In 1953 the helium shortage became acute and further emphasis was placed on research with argon-hydrogen mixtures. At this time, an answer was sought to the question: Why is porosity caused with argon-hydrogen mixtures? The first step in answering the above question was that of recognizing the problem. We believe we are the first to have discovered the reason for the occurrence of porosity when welding stainless steel with argon-hydrogen mixtures. Our reasoning is as follows: the hydrogen in the gas mixture burns and moisture is created by the reaction: $2H_2+O_2=2H_2O$. The resulting moisture condenses on everything within a few inches from the arc. Some of this moisture is trapped in the weld seam and by some means—perhaps flashing into steam—forms peculiarly shaped porosity.

Our theory fits the facts for the following two reasons. First, the shape of the porosity is unique. The holes are not round such as normally would be expected if a gas dissolved in a weld pool were being ejected as the metal solidified. Rather, the holes appear to be the result of definite explosions causing the most unusual type of porosity not found anywhere else in the art of welding. Second, all reasonable techniques designed by us to remove moisture from the seam have resulted in satisfactory welds without any porosity. Some of these solutions are listed below.

It is true that hydrogen can easily be dissolved in molten stainless steel and rejected as porosity as the metal solidifies. This hydrogen absorption occurs when arc welding stainless steel in argon-hydrogen mixtures when large weld puddles are used, such as in the welding of $1/4$ in. thick material or in re-welding a given seam several times. In these cases, direct hydrogen absorption is a factor, but the resulting porosity is round as expected. Such occurrence of hydrogen dissolving in the metal does not pertain to the present problem of gas-shielded arc welding of stainless steel plates in thicknesses up to $3/16$ of an inch in a single pass.

A number of solutions are evident once the basic problem is recognized. Any method of simply preventing the moisture from entering or remaining entrapped in the weld seam will provide conditions for the production of sound welds. Many of these conditions were tried in an effort to substantiate the above theory and some of these where highly impractical to apply on an industrial basis. These included shields of various types to keep the moisture from entering the seam, but it is difficult to apply them and maintain the necessary tight fits as the welding apparatus moves over the seam. Some of the solutions, however, are practical and have been used to advantage on an experimental basis.

The problem may be solved, according to the present invention, by simply utilizing a proper mixture of 15% hydrogen and 85% argon, for example, or by preventing the moisture from entering or remaining entrapped in the weld seam. Sound welds result, regardless of the welding speed or hydrogen content of the shielding gas.

The hydrogen of the shielding atmosphere combines with the oxygen of the air to form water vapor which condenses. This water vapor, if entrapped in the molten metal, will cause objectionable porosity in the weldment. One method of overcoming such porosity is to weld at slow enough speeds so that the gas bubbles can reach the surface of the pool before solidification occurs.

Base metal preheating above approximately 200° F. is very effective in preventing the water-condensation. Arc deflection in the forward direction also reduces the tendency for porosity formation. Such arc deflection can be obtained by inclining the torch or by the use of magnetic fields to direct the arc as in the Curtin et al. Patent No. 2,666,122. Welding with a short arc is another effective method for reducing porosity, but it is difficult to maintain and requires an increase in current to maintain a certain heat input since the reduced arc length lessens the voltage. Still another very effective method is the employment of a joint gap or spacing between the sections being welded. This latter method is very effective for continuous tube and pipe welding.

Heretofore, in butt-welding stainless steel tubing the formation of porosity in the weld has been a major problem. We have discovered that this problem can be solved by locating the arc above a point where such arc can just "see" through the gap near the apex of the angle formed by the edges of work to be welded as they come together to make the weld. This causes the water vapor to "flash" off (vaporize) before any can be trapped in the weld. As a result sound welds that are free of porosity can be made at a speed of 60 inches per minute and higher.

Figure 1:
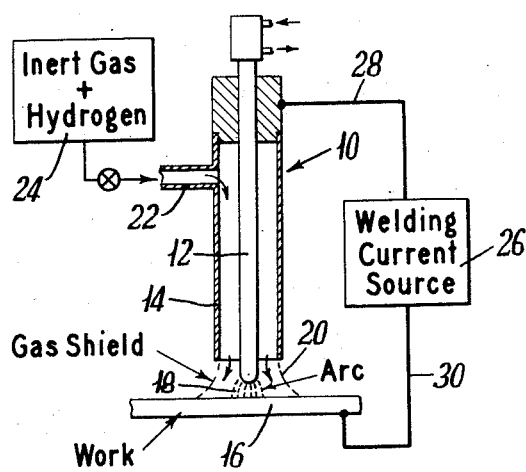
Fig. 1 is a diagram of a bead-on-plate setup illustrating the invention.

As shown in Fig. 1 an inert gas shielded arc welding torch 10 having a water cooled electrode 12 and a gas cup or nozzle 14, is disposed above the work 16 such as a metal plate, to weld the latter with an arc 18 which is shielded by a stream 20 of gas containing hydrogen. Such gas is supplied to the torch through a conduit 22 from a suitable supply source 24. The arc is energized by a welding current source 26 through insulated conductors 28 and 30 that are connected to the torch and work, respectively.

In operation, with a bead-on-plate type of weld, the moisture after condensing on the plate 16 is vaporized by the heat of the arc 18 sufficiently ahead of the weld puddle so that there is no danger of entrapping moisture. Tests have shown that, through use of this technique, sound weld beads can be produced using 100% hydrogen as the arc shielding gas. The bead-on-plate type of weld can be applied in those cases where burn-through or continuous rivet type of welds are made. In such cases, the top member of the weld is solid and the welding action closely simulates that of the bead-on-plate weld.

Figure 2:
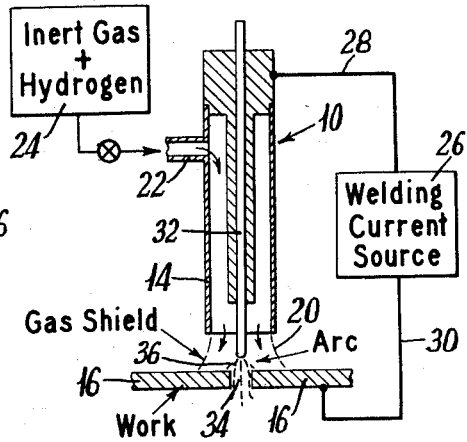
Fig. 2 is a similar view of a gapped seam modification of the invention.

In Fig. 2 the setup is similar except that the torch is provided with a tungsten electrode 32 and the plates 16, 16 to be welded are spaced to provide a gapped seam 34 through which the arc 36 can "see" and vaporize the condensed moisture. Sound welds can be produced very easily using this technique with either tungsten or water-cooled electrode torches.

There are practical limitations but, in those cases involving continuous tube welding mills where a joint gap of about 0.015 in. can be maintained at the arc, sound welds can be produced using a shielding gas mixture of 35% hydrogen and 65% argon. Most tube mills in existence can produce this gap on tubing where the metal thickness is 3/32-in. or less. It is generally not possible with present mills to provide sufficient gap where the metal thicknesses are in excess of 3/32-in. and still provide sufficient squeeze pressure to produce a weld without undercut or sink.

Figure 4:
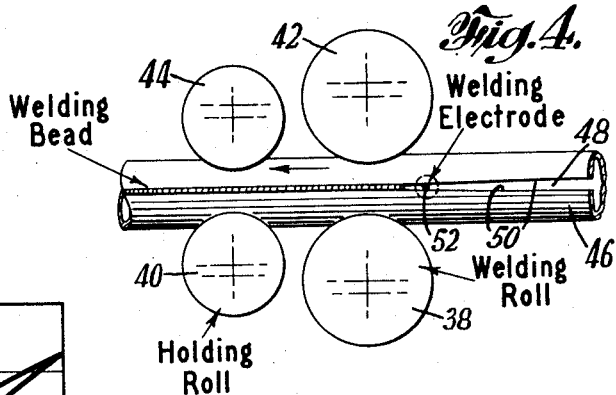
Fig. 4 is a fragmentary plan view of slightly gapped seam-tube welding setup.

Fig. 4 shows a portion of a tube mill comprising welding and holding rolls 38 and 40 which, in cooperation with corresponding rolls 42 and 44 that are located on the opposite side of the tube 46 being formed, gradually close a gap 48 between the edges of the work 50. In such case, the welding electrode 52 of the torch is located at a point where it can just "see" through the gap and vaporize the condensation. Welds in metal thicknesses of up to 0.154 in. can be so made on continuous tube mills, according to the invention, with a gas mixture composed of 20% hydrogen and 80% argon.

Figure 5:
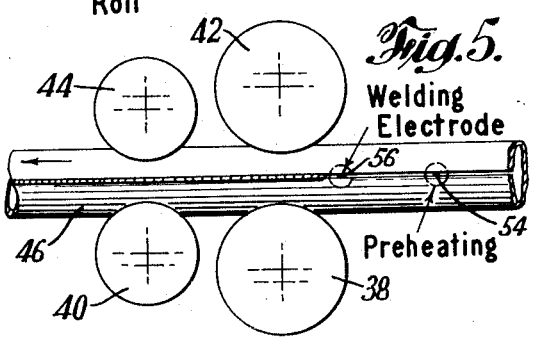
Fig. 5 is a similar view of a preheating modification.

As shown in Fig. 5, the moisture is evaporated by locating a preheating torch 54 to heat metal adjacent the seam in advance of the inert gas shielded arc welding torch 56. In such case a gas mixture of almost any hydrogen content can be used in such torch 56.

Such use of preheat prevents moisture from condensing on the work and thus provides an ideal environment for welding with argon-hydrogen mixtures without the formation of porosity.

A shielding gas mixture consisting of 15% hydrogen and 85% argon can be applied in a large number of cases according to the invention without any danger of porosity formation. In other words, we have found that a 15–85% hydrogen-argon mixture can be applied generally to the gas shielded arc welding of stainless steel. Thus, on the conventional-type butt joint that is used very widely in industry, without preheat and without gapped edges, such 85–15% mixture can be successfully used as the shielding gas. The only instances found thus far, where difficulty has occurred, are those special cases where hydrogen is used as a backing medium, where many re-welds are made on the same seam, or where welding is performed on heavily oxide-coated surfaces.

There is some question as to why 15% hydrogen in argon has been found by us to be generally acceptable, whereas previous teaching on this subject limited the amount of hydrogen to 10%. The answer to this question is not entirely understood but it may stem from the fact that the general purity of commercially available shielding gas is considerably higher than it was several years ago. Our work with argon-hydrogen mixtures has shown that while nitrogen is not a troublesome factor, small traces of oxygen or entrained moisture caused porosity. Oxygen and moisture, therefore, should be kept within manufacturers' specifications for welding grade argon, which are 20 parts per million maximum of oxygen, and 9 grams per 1,000 cubic feet maximum of moisture. Also, the use of argon as a backing medium may contribute to the success of our argon-hydrogen mixtures that contain more than 10% hydrogen.

With argon-hydrogen mixtures, our experiments have shown that the satisfactory results disclosed above can be applied to all the gas shielded arc welding of all grades of stainless steel, as well as Inconel, Monel and cupro nickel.

From time to time helium is in short supply and the emphasis has been placed on argon. Improved welding conditions, by virtue of higher speeds, and lower gas flows have been obtained by adding hydrogen to argon. The helium supply no doubt will be increased in the future and we have made experiments applying the above disclosed techniques to helium-hydrogen mixtures. The results of these experiments are outstanding and are second only to those obtained using argon-hydrogen mixtures. With hydrogen added to helium, arc voltages are higher (see Fig. 3); improved welding conditions are obtained and lower gas flows can be employed, since recognition of the basic problem involved in adding hydrogen to shielding gas has been found.

The results of our experiments using hydrogen-helium mixtures were, as expected, very similar to those obtained using argon-hydrogen mixtures. The chief difference when helium was used as the basic gas was that slightly higher percentages of hydrogen could be added to helium before porosity became a major factor as indicated in the following table:

TABLE I

| Application | Recommended hydrogen addition to argon, percent | Recommended hydrogen addition to helium, percent |
|---|---|---|
| General heliarc welding | 15 | 20 |
| General tube welding | 20 | 25 |
| Tube welding 3/32" wall and lighter material with controlled joint gap opening | 35 | 45 |

The second difference when helium is used as the basic gas is that the minimum flow rates are not as low as when argon is used as the basic gas as illustrated by the data contained in the following table:

TABLE II

| Gas: | Minimum flow rate, c.f.h. |
|---|---|
| Argon | 15 |
| Helium | 30 |
| Argon-hydrogen: | |
|    85–15 | 3 |
|    65–35 | 3 |
| Helium-hydrogen: | |
|    75–25 | 15 |
|    65–35 | 15 |

The unexpectedly low flow rates of the argon-hydrogen mixtures also may be explained by the action of the burning hydrogen. The hydrogen acts as a scavenger and consumes all oxygen in the nearby vicinity, thus preventing such oxygen, through turbulence, or in other ways, from reaching and harming the electrode and weld puddle.

The advantage of increased welding (travel) speed obtained by the employment of hydrogen or a hydrogen mixture is shown below in Table III. For example, using a welding current of 160 amperes, the maximum welding speed obtainable without encountering undercutting was 40 i.p.m. employing argon alone, whereas it was 200 i.p.m. using hydrogen as the shielding medium at about the same welding current level. These high welding speeds result from the high voltage afforded by the use of the hydrogen-containing atmospheres. Also, in Table III, it is shown that, for a constant arc length, the voltage for argon is 10 volts, whereas for hydrogen it is 32 volts.

Figure 3:
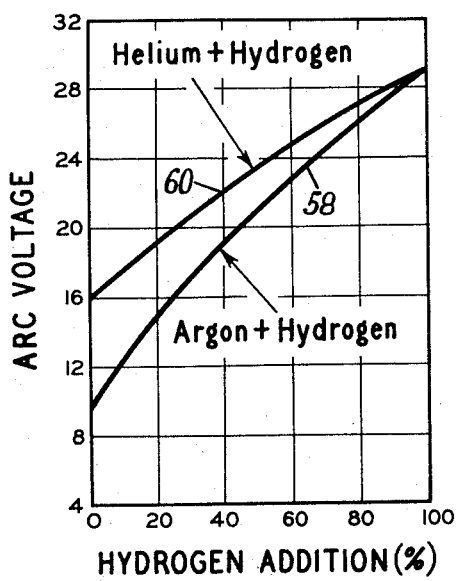
Fig. 3 is an arc voltage-hydrogen addition graph showing helium+hydrogen, and argon+hydrogen arc voltage curves.

The effect of adding hydrogen to argon and helium, respectively, on the arc voltage is demonstrated by curves 58 and 60, Fig. 3, which were obtained at a welding speed of 40 i.p.m. on 1/16-in. Type No. 304 stainless steel using 120 amperes, D.C.S.P., and a constant arc length of 0.075 in. at a flow rate of 40 c.f.h.

TABLE III

*Maximum welding speeds using various atmospheres (No. 10 nozzle, bead on plate, Type 304 stainless steel)*

| Atmosphere | Speed, i.p.m. | Current, amps. | Voltage, volts |
|---|---|---|---|
| Argon | 40 | 160 | 10 |
| Helium | 60 | 175 | 16 |
| 65% A—35% $H_2$ | 110 | 170 | 19 |
| 65% He—35% $H_2$ | 120 | 140 | 20.5 |
| Hydrogen | 200 | 140 | 32 |

An additional novel, unexpected result was obtained when hydrogen was used in combination with argon in that the required flow of gas could be appreciably decreased. As is shown above in Table II, the required flow for argon was 15 c.f.h., whereas using 65%–35% hydrogen the required flow was only 3 c.f.h.

Since the addition of hydrogen in all percentages increases the voltage shown graphically in Fig. 3, additions of hydrogen from 1 to 100% to either argon or helium had a beneficial effect on the speed of welding. By the use of the special techniques aforementioned, the level of porosity can be controlled using all additions of hydrogen. This invention is especially applicable to all grades of stainless steel, and either A.C. or D.C. power is satisfactory.

We claim:

1. Process of arc welding stainless steel sheet at greatly increased welding speeds without undercutting, which comprises spacing to provide a gap of the order of 0.015 inch between the parts to be welded so that an arc can just "see" through the gap, shielding such arc and the adjacent metal with an annular stream of inert gas containing more than 15% and up to about 100% hydrogen, fusing such metal adjacent the gap with said arc at a speed of 60 to 100 inches per minute, merging such fused metal, and permitting the so-merged metal to solidify to form a weld, characterized in that such hydrogen is effectively discharged through such gap and not trapped in such weld.

2. Process of arc welding stainless steel as defined by claim 1, in which such gap is formed between the opposite edges of sheet having a maximum wall thickness of 0.154 in., and such shielding gas mixture is composed of a maximum of 85% hydrogen, the balance being commercially pure argon.

References Cited in the file of this patent

UNITED STATES PATENTS

| | | |
|---|---|---|
| 1,495,272 | Stresau | May 27, 1924 |
| 1,746,191 | Devers | Feb. 4, 1930 |
| 2,339,403 | Hess | Jan. 18, 1944 |
| 2,468,371 | Landis et al. | Apr. 26, 1949 |
| 2,497,631 | Rothschild | Feb. 14, 1950 |
| 2,510,180 | Jones | June 6, 1950 |
| 2,522,482 | Olzak | Sept. 12, 1950 |
| 2,602,871 | Noland et al. | July 8, 1952 |

OTHER REFERENCES

General Electric Review, March 1926 issue, pages 160–168.